Feb. 8, 1938.   J. W. THOMPSON   2,107,312
ATTACHMENT FOR APPREHENDING MOTOR VEHICLES
Filed Feb. 25, 1936
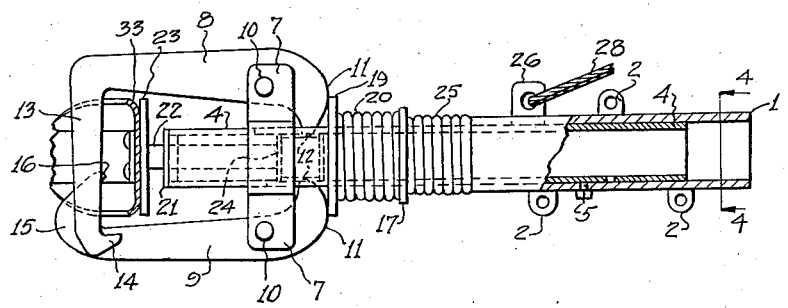
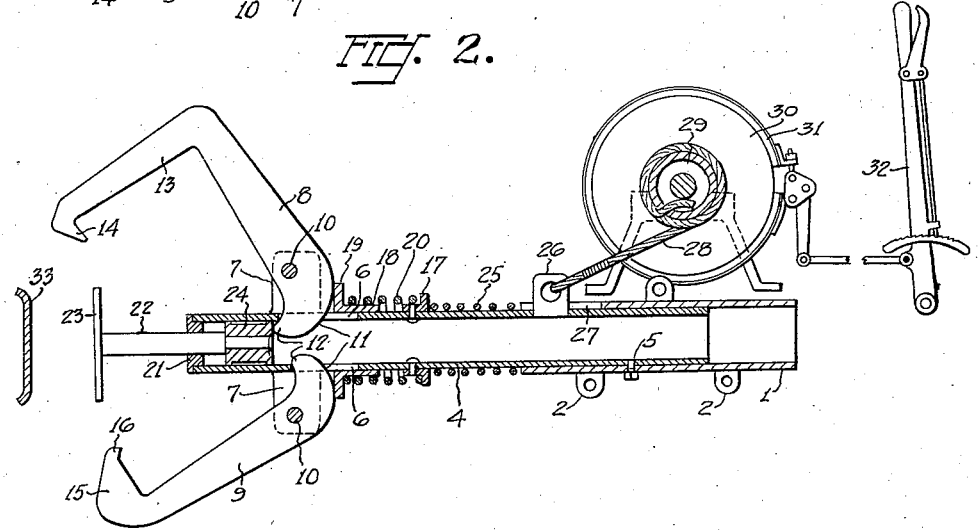
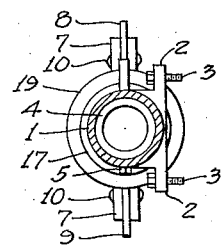
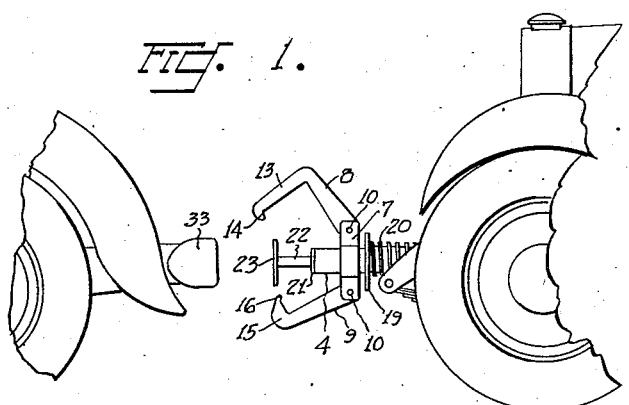
INVENTOR
JOSEPH W. THOMPSON
BY
ATTORNEY Patented Feb. 8, 1938

2,107,312

UNITED STATES PATENT OFFICE 2,107,312

ATTACHMENT FOR APPREHENDING MOTOR VEHICLES

Joseph W. Thompson, Portland, Oreg.

Application February 25, 1936, Serial No. 65,736

11 Claims. (Cl. 280—33.15)

This invention is directed to an attachment for motor vehicles whereby a vehicle so equipped may, when necessary, pursue a fleeing vehicle, physically connect the attachment thereto, and control the speed and power of travel of the fleeing vehicle by appropriate brake action of the pursuing vehicle.

It not infrequently happens, particularly in connection with the recognized authorities, that it is important to overtake and stop a fleeing vehicle in order to investigate or arrest the occupants. Heretofore it has been customary to follow the vehicle and attempt to force it into the ditch or side of the road to compel it to stop. This method not infrequently results in serious accidents not only to the occupants in the fleeing vehicle but to the authorities in the pursuing vehicle.

With a view to permitting a pursuing vehicle to connect itself to a fleeing vehicle and thereafter utilize its own brake power to force the fleeing vehicle to eventually come to a stop, the present invention contemplates the use of an attachment on the pursuing vehicle which may be automatically coupled or connected to the fleeing vehicle to insure that the fleeing vehicle may be subject to the brake power of the pursuing vehicle and that the two vehicles will remain connected in order that the fleeing vehicle may at least not be lost sight of and eventually captured.

The invention contemplates an attaching element involving hook-like securing members which are normally open and which are moved into a position to substantially embrace the bumper or other appropriate part of the fleeing vehicle, the connecting act being automatic on impact of a portion of the attachment with the bumper or other part of the fleeing vehicle. Following the connection of the attachment to the fleeing vehicle, the actual holding parts are maintained in gripping relation and the attachment proper is free from its support on the pursuing vehicle and remains connected to the pursuing vehicle through the medium of a cable, the operation of which is controlled by the pursuing vehicle.

The invention is illustrated in the accompanying drawing, in which:

Figure 1 is a view in broken elevation illustrating the application and use of the improved attachment.

Figure 2 is a longitudinal sectional view, partly in elevation, of the attachment proper, the gripping elements being shown in open position.

Figure 3 is a similar view, the cable drum being omitted and the attachment shown in gripping position.

Figure 4 is a transverse section on the line 4—4 of Figure 3.

The attachment includes a tubular member 1 which, through the medium of offset ears 2, may be securely bolted, as by bolts 3, to an appropriate part of the forward portion of a vehicle. Slidably mounted in the tubular member 1 is a sleeve 4 which, except when connected to a fleeing vehicle, is fixed relative to the tubular member 1 by a readily shearable pin 5.

The sleeve 4 is formed somewhat in rear of its forward free end with diametrically opposed slots 6 and provided with outstanding ears 7 on each side of each slot. Gripping levers 8 and 9 are pivotally supported at 10 between the respective pairs of ears. The ends of the levers between their pivotal support and the sleeve 4 are formed with rounded cam sectors or edges 11 terminating in rounded points 12.

The levers 8 and 9 are not of identical gripping formation, the lever 8 being terminally formed with a lateral, somewhat elongated extension 13 terminating in a hook end 14 while the lever 9 has a relatively shorter lateral extension 15 with a slight terminal hook 16. An outstanding flange 17 is rigidly secured to the sleeve 4 rearwardly of the lever mounting and in advance of the forward end of the tubular element 1.

Slidably mounted on the sleeve 4 in advance of the flange 17 is a collar 18 having an outstanding annular projection or flange 19 designed to bear against the cam edges of the levers 8 and 9. A spring 20 is coiled about the sleeve 4, bearing between the flange 19 of the collar 18 and the flange 17. This spring serves to maintain the collar flange 19 in pressure contact with the cam edges of the levers 8 and 9, serving an important function, as will later appear.

Guided in axial opening in a plug 21 fixed in the forward end of the sleeve 4 is a rod 22, the forward end of which is provided with an impact disk 23 of a diameter materially exceeding that of the sleeve 4 and providing the impact element to be driven into contact with the fleeing vehicle and serving to operate the gripping levers.

The end of the rod 22 within the sleeve 4 is provided with an element in the form of a plunger or piston 24. This piston has a diameter slightly less than the interior diameter of the sleeve 4 in order that a slight free space surrounds the piston.

A buffer or shock absorbing spring 25 encircles the sleeve 4, bearing at its forward end against the flange 17 and at its rear end against the forward end of the tubular element 1. The sleeve 4 is provided adjacent its rear end with an ear 26 normally extending through a slot 27 in the tubular member 1, which slot opens through the end of the member, as indicated.

A cable 28 is terminally secured to the ear 26 and wound about a drum 29 mounted on an appropriate part of the vehicle, which drum is provided with a brake drum 30, the brake band 31 of which may be appropriately controlled through a manually governed lever 32.

It will be noted from Figure 2 of the drawing that in the normal or inoperative position of the parts, the sleeve 4 is connected to the vehicle-carried tubular element 1 by the pin 5 which, as stated, is capable of being readily sheared or broken. The flange 19 of the collar 18 bears against the cam edges of the levers 8 and 9 inwardly of the pivotal support of such levers, causing the spring 20 to force the flange 19 against the levers and thereby holding them with their operative ends widely spread, as indicated.

The pursuing vehicle is driven to cause the disk 23 to be brought into pressure contact with an appropriate part of the fleeing vehicle, such, for example, as the rear bumper indicated at 33 in Figure 3. Under this impact, the piston 24 moves rearwardly and contacting with the ends of the levers 8 and 9, which normally extend within the sleeve 4, rocks the levers on their pivots 10 against the influence of the spring 20 and causes the levers to move into embracing relation with the bumper, the lower lever 9 passing upwardly from the lower edge of the bumper while the upper lever 8 passes downwardly over the upper edge of the bumper, with the extension 13 of such lever 8 of such length that the hook terminal 14 of this lever 8 will pass below the lower edge of the bumper. The operative ends of the levers thus form an effective gripping element which insures an absolute positive connection with the bumper of the fleeing vehicle.

Under the impact on the disk 23 and the corresponding rearward movement of the piston 24 to operate the levers, the piston, in rocking the levers, rides between the extreme inner ends or rounded nose portions 12 of the levers. The proportions of the parts are such that when the plunger or piston 24 has been moved a distance responsive to the impact movement of the disk 23 to move the levers to operative gripping position, the plunger or piston will rest between the rounded inner ends 12 of the levers and so hold the levers against opening movement. This disposition of the parts is illustrated in Figure 3. This means to maintain the levers in operative position is materially assisted by the spring 20 which, by reason of the bearing of the flange 19 inwardly of the pivots 10 of the levers and against an appropriate cam edge of the levers, will prevent that rocking movement of the levers tending to an opening thereof.

Following the connection of the attachment to the fleeing vehicle, the pursuing vehicle is reduced in speed which tends to shear the pin 5 under the pull on the sleeve 4 through the travel of the fleeing vehicle and the sleeve 4, connected to the fleeing vehicle, moves out of the tubular element 1 and is thereafter free of connection with the pursuing vehicle except through the medium of the cable 28.

The extension of the cable is permitted by appropriate control of the brake band 31 until the vehicles are separated a desired distance with the connection between them a more or less flexible one to permit the driver of the pursuing vehicle to have more or less control over the direction and travel of his vehicle without being directly influenced by any sudden movement of the fleeing vehicle as might be contemplated in an effort to escape. The pursuing vehicle is then gradually braked to exert a gradually increasing retarding influence on the fleeing vehicle with a view to so reducing its speed as to eventually compel it to be brought to a stop.

There is another and rather important detail resulting from the construction described and that is the necessity for requiring the services of at least two people to release and reset the attachment. When the fleeing vehicle has been brought to a stop and the pursuing vehicle moved to a position to slack the cable 28, pressure in the closing direction is exerted upon the levers 8 and 9 to release the bearing contact of the ends of such levers upon the plunger 24. The plunger 24, rod 22 and impact disk 23 may then be moved forwardly to normal position, freeing the ends of the levers. The levers may then be opened and held in open position under the influence of the spring 20 and the flange 19 of the collar 18, as previously described.

It will thus be noted that one person is necessary to move the levers 8 and 9 toward each other to permit a releasing and resetting of the parts and that another person is necessary to move the impact disk and its connected parts forwardly to free the levers. Thus, at least two people are required to unlock and release the attachment, thus rendering it impossible for a single individual, for example, in the fleeing vehicle, from throwing off or releasing the attachment while the vehicle is moving which is of material value in maintaining the connection between the pursuing and fleeing vehicles except and unless the vehicles are brought to a standstill and the efforts of at least two persons are employed to secure the release.

After the release of the attachment, the cable 28 is wound upon a drum, the sleeve 4 again telescoped in the tubular member 1 and a new securing pin 5 secured in position.

The improvement thus provides an attachment which may be readily applied to a motor car and which may be easily and accurately coupled to a fleeing car in order to control and eventually stop such fleeing car. Through the medium of the cable, the respective cars are maintained at a sufficient distance to permit the driver of the pursuing car to control his car with considerable safety, regardless of the sudden stopping of the fleeing car or the sudden turning or veering in an attempt to wreck or otherwise damage the pursuing car.

Of course, as a safety requisite, the drum-carried end of the cable 28 may be wound upon the drum in sufficient length to insure that any desired distance between the cars may be maintained without exhausting the cable on the drum, with the end of the cable wound about the drum unconnected from the drum. Thus, under extremely hazardous or dangerous conditions, the brake on the drum may be released, the pursuing car brought to a standstill and the cable completely released from the drum in order to completely disconnect the cars. Thus, if the fleeing vehicle, for example, would approach a railroad crossing in the face of an approaching train, with conditions such that the fleeing vehicle might get safely over the track while the pursuing vehicle would not, or under any other hazardous conditions, the operator of the pursuing vehicle may free the fleeing vehicle at will.

While the attachment is described as primarily intended as a motor vehicle attachment and more particularly designed to permit a pursuing vehicle to overtake and gradually stop a fleeing vehicle, it is apparent that the improvement could be applied to other vehicles as, for example, track-traveling vehicles, to enable a vehicle so provided to overtake and check a runaway car, and that the attachment might also be used obviously to advantage for connection to a vehicle which is in a ditch or off the road to assist in removing the disabled vehicle from such position; and further the attachment may readily lend itself through proper and appropriate positioning as a towing connection.

What is claimed to be new is:

1. An attachment for a motor vehicle whereby such vehicle may be connected at will with an advance vehicle, including a sleeve mounted on the vehicle, gripping levers mounted on and having terminals extending within the sleeve, means for normally maintaining the gripping levers in inoperative relation, an impact element designed to be brought into pressure contact with the advance vehicle under appropriate movement of the following vehicle, and a plunger movable within the sleeve and actuated by the impact element, said plunger engaging the terminals of the levers within the sleeve and swinging said levers to operative positions in advance of the impact element, the plunger, following the swinging movement of the levers, passing between the terminals of the levers within the sleeve to engage said terminals and prevent swinging movement of the levers in the opposite direction.

2. A construction as defined in claim 1, including a vehicle-carried tubular element for supporting the sleeve, readily severable means connecting the sleeve and element and disruptable following operative movement of the levers to free the sleeve from the tubular element.

3. A construction as described in claim 1, wherein the sleeve is slidably supported in a vehicle-carried tubular element, means to permit separation of the sleeve and element, and a cable connected to the sleeve and controlled on the vehicle carrying the attachment.

4. An attachment for motor vehicles whereby such vehicle may be connected to an advance vehicle, comprising a tubular element fixed with relation to the vehicle, a sleeve mounted in the tubular element, gripping levers carried by the sleeve, spring-pressed means on the sleeve for maintaining the levers in inoperative position, an impact element mounted in the sleeve and subjected to endwise movement under pressure contact with the advance vehicle, and a plunger on the impact element engaging the ends of the levers on the movement of the element and forcing the levers to operative position.

5. A construction as defined in claim 4, wherein the impact element includes a plunger serving under operative movement of the impact element to lock the levers in operative position.

6. A construction as defined in claim 4, including means to free the sleeve from the tubular element at will and a flexible connector controllable as to operative length arranged between the sleeve and the vehicle carrying the attachment.

7. A construction as defined in claim 4, including cam edges formed on the levers, and a spring-pressed collar cooperating with the cam edges of the levers to hold the levers normally in inoperative position.

8. An attachment for a motor vehicle whereby such vehicle may be connected at will to a vehicle in advance, comprising an impact element to be brought into pressure contact with the advance vehicle, gripping levers moved by the impact element into gripping relation with a portion of the advance vehicle, a member carrying said impact element and gripping levers, means for normally connecting the member to the following vehicle, said means being severable to free the member from its fixed connection with the following vehicle, and a flexible element connected to the member and to the following vehicle to maintain control of the member notwithstanding its disconnection from the following vehicle.

9. An attachment for a motor vehicle to permit such vehicle to be automatically connected to a vehicle in advance, including a tubular support on the following vehicle, a member movably mounted in said support, disruptable means connecting the member and support, levers carried by the member to be moved to a position to grip a portion of the vehicle in advance, an impact element carried by the member and movable under impact with the advance vehicle to move the levers to gripping position, the disruptable connection between the member and support being broken at will, and a cable connecting said member and the vehicle carrying the support.

10. A construction as defined in claim 9, including means on which one end of the cable is wound, and a manually controlled brake for said means.

11. An attachment for motor vehicles whereby such vehicle may be connected at will with an advance vehicle, including a tubular member mounted on the vehicle, levers pivotally connected in diametrically opposed relation on the member, the ends of the levers extending within the member, a plunger movable longitudinally of the member to engage the ends of the levers within the member and move the opposing ends of the levers into operative position, and an impact member connected to the plunger and arranged in advance of the member to engage a portion of the advance vehicle and compel lever operative movement of the plunger.

JOSEPH W. THOMPSON.